US008126242B2

(12) United States Patent
Brett et al.

(10) Patent No.: US 8,126,242 B2
(45) Date of Patent: Feb. 28, 2012

(54) COMPUTER PROGRAM PRODUCTS AND METHODS FOR DETECTION AND TRACKING OF RHEUMATOID ARTHRITIS

(75) Inventors: Alan Brett, Manchester (GB); Jane Haslam, Bucks (GB); Anthony Holmes, Cheshire (GB)

(73) Assignee: Optasia Medical Limited, Cheadle (GB)

(*) Notice: Subject to any disclaimer, the term of this patent is extended or adjusted under 35 U.S.C. 154(b) by 1049 days.

(21) Appl. No.: 12/015,306

(22) Filed: Jan. 16, 2008

(65) Prior Publication Data

US 2008/0175464 A1      Jul. 24, 2008

Related U.S. Application Data

(60) Provisional application No. 60/880,601, filed on Jan. 16, 2007.

(51) Int. Cl.
*G06K 9/00* (2006.01)
(52) U.S. Cl. .......................................... 382/131; 382/132
(58) Field of Classification Search .................. 382/128, 382/131, 132
See application file for complete search history.

(56) References Cited

U.S. PATENT DOCUMENTS

| | | | |
|---|---|---|---|
| 5,360,446 A | 11/1994 | Kennedy | |
| 5,871,018 A | 2/1999 | Delp et al. | |
| 6,002,859 A | 12/1999 | DiGioia, III et al. | |
| 6,190,320 B1 | 2/2001 | Lelong | |
| 6,701,174 B1 | 3/2004 | Krause et al. | |
| 6,711,432 B1 | 3/2004 | Krause et al. | |
| 6,963,825 B1 | 11/2005 | Morikawa et al. | |
| 7,027,650 B2 | 4/2006 | Williame et al. | |
| 7,227,981 B1 | 6/2007 | Fleute et al. | |
| 7,388,972 B2 | 6/2008 | Kitson | |
| 2003/0053673 A1 | 3/2003 | Dewaele | |
| 2003/0210813 A1 | 11/2003 | Oosawa | |
| 2008/0025638 A1 | 1/2008 | Chen et al. | |
| 2008/0031412 A1 | 2/2008 | Lang et al. | |
| 2008/0118137 A1 | 5/2008 | Chen et al. | |

FOREIGN PATENT DOCUMENTS

| | | |
|---|---|---|
| EP | 1 424 650 | 6/2004 |
| EP | 1 598 778 | 11/2005 |
| GB | 2402470 | 8/2004 |

(Continued)

OTHER PUBLICATIONS

Brett, A.D. "Statistical Modeling for the Assessment of Vertebral Shape in vivo" Optasia Medical Power Point Presentation, BioImaging Seminar, May 31, 2007 (7 pages).

(Continued)

*Primary Examiner* — Irakli Kiknadze
(74) *Attorney, Agent, or Firm* — Wilmer, Cutler, Pickering, Hale and Dorr LLP

(57) ABSTRACT

Methods for producing an image indicative of arthritic symptomatology are provided. The methods during a model building phase create a constrained deformable statistical template. The methods then during a runtime phase fit a plurality of loci in a digitized target radiograph of the specified joint; parameterize positions of the plurality of loci fitted in the digitized target radiograph to generate an instance of the statistical template by deriving values for parameters of the digitized target radiograph from the statistical template; search the digitized target radiograph by applying the statistical template to the digitized target radiograph until an optimal fit of the statistical template to at least one region of the digitized target radiograph is found; and produce a comparison image by comparing the at least one region of the digitized target radiograph with the optimal fit of the statistical template.

23 Claims, 3 Drawing Sheets

FOREIGN PATENT DOCUMENTS

| | | |
|---|---|---|
| GB | 2402470 A | 12/2004 |
| JP | 2003-144454 | 5/2003 |
| WO | WO-2006/104707 | 10/2006 |
| WO | WO-2008/087556 | 7/2008 |
| WO | WO-2009/154977 | 12/2009 |

OTHER PUBLICATIONS

Brett, A.D. et al. "Automated Assessment of Vertebral Shape by Statistical Shape Modelling on Lateral radiographs" ABSMR Abstract Publication. Sep. 14, 2007 (2 pages).
Brett, A.D. et al. "Automated Assessment of Vertebral Shape on Lateral Radiographs by Statistical Shape Modeling" RSNA 2007 Abstract, Nov. 25, 2007 (1 page).
Brett, A.D. et al. "Automated Assessment of Vertebral Shape by Statistical Shape Modeling on Lateral Radiographs" ASBMR Poster Presentation, Sep. 19, 2007 (1 page).
Cootes, T.F. and Taylor, C.J. "Anatomical statistical models and their role in features extraction," *Brit. J. Radiol.* 77(2004):S133-S139.
Davies, R.H. et al. "A minimum description length approach to statistical shape modeling," *IEEE Trans. Med. Imag.* 21(5) May 2002: 525-537.
Duryea, J. et al. "Trainable rule-based alforithm for the measurement of joint space width in digital radiographic images of the knee," *Med. Phys.* 27(3) (Mar. 2000):580-591.
European Examination Report, European Patent Application No. 06 738 603.7, dated Jul. 24, 2008 (7 pages).
Fleute, M. "Nonrigid 3-D/2-D registration of images using statistical models," Lecture Notes in Computer Science, Springer Verlag, New York, NY. US (Sep. 19, 1999):138-147.
Fleute, M. et al. "Incorporating a statistically based shape model into a system for computer-assisted anterior cruciate ligament surgery," *Med. Imag. Anal.* 3(3):209-222 (1999).
S.J. Caulkin, Generating Synthetic Abnormalities in Digital Mammograms Using Statistical Models, Ph.D. Thesis, University of Manchester, 2001 (pp. 1-228, 266-268).
U.S. Appl. No. 11/376,868, filed Mar. 16, 2006, Walker.
Bland and Altman *British Medical Journal*, 1996; 313:744.
Boini et al., *Annals of the Rheumatic Diseases*, 2001; 60: 817-827.
Bruynesteyn et al., *Arthritis & Rheum*, 2002; 46(4): 913-920.
Cootes T.F. et al., "Active Appearance Models", European Conference on Comptuer Vision, vol. 2, No. 1, Jan. 1, 1998, pp. 484-498.
Cootes T.F. et al., "Use of Active Shape Models for Locating Structures in Medical Images", Image and Vision Computing, vol. 12, No. 6, Jul. 1, 1994, pp. 355-365.
Cootes T.F., et al., "Constrained Active Appearance Models", Proceedings of the Eight IEEE International Conference on Computer Vision, Jul. 7-14, 2001, vol. 1, pp. 748-754.
Cootes, et al., *Training Models of Shape from Sets of Examples*, in Proc. BMVC Springer-Verlag, pp. 9-18, 1992.
Genant et al., *Arthritis Rheum*, 1998; 41: pp. 1583-1590.
Johnson and Wichern, *Applied Multivariate Statistical Analysis*, pp. 458-513 (5th Edition, 2002).
Kainberger F. et al., "Computer Assisted Radiologic Diagnostics of Arthritic Joint Alterations", Zeischrift Fur Rheumatologies, vol. 65, No. 8, Dec. 1, 2006, pp. 676-680.
Langs et al., "Model-Based Erosion Spotting and Visualization in Rheumatoid Arthritis" Academic Radiology, vol. 14, No. 10, Sep. 20, 2007, pp. 1179-1188.
Langs et al., Scandinavian Conference on Image Analysis 2003, Lecture Notes in Computer Science 2749, pp. 454-461, 2003 and Academic Radiology 2007.
Patent Cooperation Treaty International Search Report, dated Jul. 30, 2008, 5 pages.
Peloschek et al., "Quantative Imaging in Rheumtoid Arthritis: From Scoring to Measurement", Der Radiologe; Zeitschrift Fur Diagnostische Und Interventionelle Radiologies, Radioonkologie, Nuklearmedizin, vol. 46, No. 5, May 1, 2006, pp. 411-416.
Rau et al., *The Journal of Rheumatology*, 1995; 22: pp. 1976-1982.
Scott et al., *British Journal of Rheumatology*, 1995; pp. 34-56.
T.F. Cootes and C.J. Taylor, Statistical Models of Appearance for Medical Image Analysis and Computer Vision, in Proc. SPIE Medical Imaging, 2001.
Van Der Heijde et al., *Rheumatology*, 1999; 38: 1213-20.
Van Der Heijde et al., *The Lancet*, 1989; i: pp. 1036-1038.
Zhang et al., Local Features and Kernels for Classification of Texture and Object Categories: A Comprehensive Study, International Journal of Computer Vision, Sep. 2006.
de Bruijne, et al., "Quantitative Vertebral Morphometry Using Neighbor-Conditional Shape Models," ScienceDirect, Medical Image Analysis 11, 2007, pp. 503-512, 11 pages.
Eastell, et al., "Classification of Vertebral Fractures," Journal of Bone and Mineral Research, vol. 6, No. 3, 1991, pp. 207-215, 10 pages.
Genant, et al., "Vertebral Fracture Assessment Using a Semiquantitative Technique," Journal of Bone and Mineral Research, vol. 8, No. 9, 1993, pp. 1137-1148, 13 pages.
Howe, et al., "Hierarchical Segmentation of Cervical and Lumbar Vertebrae Using a Customized Generalized Hough Transform and Extensions to Active Appearance Models," 2004, 6th IEEE Southwest Symposium, pp. 182-186.
Kalidis, et al., "Morphometric Analysis of Digitized Radiographs: Description of Automatic Evaluation," Current Research in Osteoporosis and Bone Mineral Measurement II, Britich Institute of Radiology, London, Chapter 2. Radiological Measurement of Bone I, 1992, pp. 14-16.
Long et al., "Segmentation and Image Navigation in Digitized Spine X-Rays," Medical Imaging 2000: Image Processing, Proceedings of SPIE, vol. 3979, pp. 169-179.
McCloskey, et al., "Original Article: The Assessment of Vertebral Deformity: A Method for Use in Population Studies and Clinical Trials," Osteoporosis Int., May 1993, vol. 3, No. 3, pp. 138-147, 11 pages.
Roberts et al., "Original Article: Vertebral Morphometry, Semiautomatic Determination of Detailed Shape from Dual-Energy X-ray Absorptiometry Images Using Active Appearance Models," Investigative Radiology, vol. 41, No. 12, Dec. 2006, pp. 849-589, 12 pages.
Roberts, et al., "Automatic Segmentation of Lumbar Vertebrae on Digitised Radiographs Using Linked Active Appearance Models," Proc. Medical Image Understanding and Analysis, 2006, vol. 1, pp. 120-124, 5 pages.
Smythe, et al., "Vertebral Shape: Automatic Measurement with Active Shape Models1," Radiology, May 1999, vol. 211, No. 2, pp. 571-578, 9 pages.
Zamora, et al., "Hierarchical Segmentation of Vertebrae from X-ray Images," Medical Imaging 2003: Image Processing, Proceedings of SPIE, vol. 5032, pp. 631-642.

202   204

COMPUTER PROGRAM PRODUCTS AND METHODS FOR DETECTION AND TRACKING OF RHEUMATOID ARTHRITIS

CROSS-REFERENCE TO RELATED APPLICATIONS

This application claims the benefit of the earlier filing date under 35 U.S.C. §119(e) of U.S. Provisional Patent Application Ser. No. 60/880,601, filed Jan. 16, 2007, which is hereby incorporated by reference herein in its entirety.

TECHNICAL FIELD

The present invention relates generally to methods and computer program products for automated or semi-automated analysis of digitized radiographs for research and various other investigational uses or diagnosis and tracking of rheumatoid arthritis.

BACKGROUND

Rheumatoid arthritis (R.A.) is a chronic disease characterized, primarily, by inflammation of the lining, also referred to as synovium, of the joints. Rheumatoid arthritis can lead to long-term joint damage with resulting chronic pain, loss of function and disability. Rheumatoid arthritis affects an estimated 1 to 2% of the world's population. As a matter of definition, rheumatoid arthritis is considered to be a chronic, symmetric polyarthritis (i.e., an arthritis involving more than 5 separate joints). Distinguishing characteristics include a positive blood test for rheumatoid factors in most patients, additional laboratory evidence of inflammation, lumps under the skin near bones or joints, known as "rheumatoid nodules," specific joint involvement, and proliferative joint destruction. Despite these characteristics, diagnosis of rheumatoid arthritis is not always obvious and typically requires a medical history, a physical exam, lab tests, and imaging of joints or other areas known to be afflicted by the disease.

Radiographic images, such as x-ray images, provide a valuable baseline for comparing images taken at different points in time and are the mainstay of diagnosis for rheumatoid arthritis. For example, x-ray images show the swelling of the soft tissues and the loss of bone density around the affected joints that are the result of reduced activity and inflammation. As the disease progresses, x-ray images can show small holes or erosions near the ends of bones and narrowing of the joint space due to loss of cartilage. Doctors used to wait until the appearance of erosion before beginning aggressive treatment of the disease. However, now it is widely believed that it is better to treat rheumatoid arthritis aggressively before the development of erosions.

Methods and systems that rely on Magnetic Resonance Imaging (MRI) can detect a sign of early inflammation before it becomes visible on an x-ray image, and are particularly good at pinpointing synovitis. They provide greater sensitivity for bone erosions than radiography does, especially in the early phases of rheumatoid arthritis when radiography is relatively uninformative. This, along with the ability to detect pre-erosive features, such as synovitis and bone edema, allows MRI-based methods and systems to help identify patients with the aggressive phenotype of rheumatoid arthritis very early in the course of the disease. The MRI-based systems and methods can also be used to monitor disease progression and treatment response in clinical trials with greater statistical power than the radiography can offer.

Accordingly, as the introduction of structure-modifying therapy into mainstream clinical practice drives the demand for sensitivity and precision in predicting and monitoring erosive damage in early rheumatoid arthritis beyond the technical limits of conventional radiography, MRI-based systems and methods and specialized molecular markers have become increasingly attractive alternatives for evaluating therapeutic efficacy in clinical trials as well as in clinical practice. The cost associated with the MRI-based systems and methods, however, is proving to be prohibitive for routine clinical use. Thus, for the moment, analysis using radiography remains the primary image-based diagnostic tool.

One known approach for detection and tracking of rheumatoid arthritis is to determine scores or levels indicative of the severity and/or the progression of the disease. Existing systems for providing scores based on the severity of the disease and/or the extent to which the disease has progressed are divided into two groups: they are global and detailed scoring systems. Global scoring systems assign one score to an entire joint, taking into account all the abnormalities seen, whereas detailed systems assign scores on at least two separate variables for each joint evaluated.

The most widely used detailed scoring system is the Modified Sharp Scoring System and its variations, which are described in detail by Van der Heijde et al. in *The Lancet*, 1989; i: pp. 1036-38 and by Genant et al. in *Arthritis Rheum.*, 1998; 41: pp. 1583-90. The most widely used global scoring system is the Modified Larsen Scoring Systems and its variations, which are described in detail by Rau et al. in *The Journal of Rheumatology*, 1995; 22: pp. 1976-82 and by Scott et al. in *British Journal of Rheumatology*, 1995; pp. 34:56.

The smallest detectable difference (SDD) of the Modified Sharp Scoring System, for example, is found to be 5.0 units out of a score that ranges between 0 and 488, and its mean sensitivity to changes at the threshold of the SDD for joint space width and erosions is 87% with a corresponding specificity of 83%, whereas when only erosions are considered, the sensitivity is 40-52% with a corresponding specificity of 92-100%, as presented by Bruynesteyn et al. in *Arthritis & Rheum.*, 2002; 46(4): 913-920. It is desired that an automated method would provide a SDD that is no worse than 5.0 units, and preferably less than 3.0 units.

The Modified Sharp Scoring System also has an intra-rater reliability of intra-class correlation coefficients (ICC) that is equal to 0.96 for prevalence and an inter-rater reliability of ICC that ranges between 0.83 and 0.86 for progression, as presented by Boini et al. in *Annals of the Rheumatic Diseases*, 2001; 60: 817-827. It is desired that an automated method would provide corresponding intra-rater liability and inter-rater liability of ICC values that are no worse than what may be obtained manually, and preferably larger than 0.97 and 0.90, respectively.

The time needed to score radiographs of hands and feet with the Modified Sharp Scoring System ranges from 11.1 minutes to 20.5 minutes according to Van der Heijde et al. in *Rheumatology*, 1999; 38: 1213-20. Such magnitude of time delay is one drawback of scoring using the Modified Sharp Scoring System. It is desired that an automated method would preferably score a joint in less than 5 minutes.

Another approach for detection and tracking of rheumatoid arthritis was suggested by Langs et al. in *Scandinavian Conference on Image Analysis* 2003, *Lecture Notes in Computer Science* 2749, pp. 454-461, 2003 and *Academic Radiology* 2007, 14:1179-88. This particular approach uses an Active Shape Model (ASM), which is a type of statistical template, to identify the boundary of bones, such as finger bones. It then uses the identified boundary to draw around or annotate the boundary of erosions. It builds a statistical model from images of joints or bones free of the disease in order to find the bone contours, but then it uses the statistical model to annotate the erosions by driving a non-statistical model into the crenulations of the contour.

Several issues in developing and selecting a desired method or system for providing disease progression scores should be considered. Reader disagreement and inter- and intra-observer variations are important issues, though they can often be minimized by a sufficient training period to ensure familiarity with a particular scoring system or method. These problems are compounded by the need to assign a discrete number or score to a continuum of damage. Questions about the sensitivity of scoring systems or methods in detecting change over time have also been raised.

A recent report by an international panel of experts found that with the Modified Sharp Scoring systems and methods, the smallest detectable difference, which is 5.0 units, corresponded closely with the minimal clinically important difference (MCID), which is defined as radiographic progression for which a rheumatologist would consider changing or modifying the treatment. In contrast, the smallest detectable difference by the Modified Larsen systems and methods was found to be too insensitive to use as the threshold for clinically relevant change.

As a result, changes that occur to patients in the early phases of rheumatoid arthritis and to patients with more progressed rheumatoid arthritis as well as high disease activity in some cases often go undetected. The ability of scoring systems and methods to assess radiological sign of healing caused either by medical intervention or other means may also be an issue. Healing phenomena can be seen in about 6% of joints; this figure may be increased by the new disease-modifying anti-rheumatic drugs (DMARDs). Accordingly, radiographic scoring systems and methods used in clinical trials should be able to take the possibility of healing into account.

Therefore, there is a need to measure joint destruction as indicated by one or more of the presence of erosions and/or cysts, joint space narrowing, subluxation and other radiographic signs of joint degradation, or signs of healing, in the joints in a way that allows these measurements to be compared at various time points in a longitudinal study for individual patients.

A software system for building and using a statistical template was first developed between 1999 and 2001 by Gareth Edwards, Kevin Walker, and Alan Brett at Image Metrics Limited. The first version of the software system to demonstrate the capability of creating templates using samples of hand radiographs was built in February 2006.

SUMMARY OF THE INVENTION

The present invention provides methods and computer program products for automated or semi-automated analysis of digitized radiographs for research and various other investigational uses or diagnosis and tracking of rheumatoid arthritis.

Methods for automatically determining numerical measures of the differences of a digitized target radiograph relative to non-pathological shape and appearance represented by a computer model are provided. The methods during a model building phase build a computer model from a set of sample radiographs chosen to substantially exclude pathological variations of a specified joint to represent normal, non-pathological variations in radiographical shape and appearance of said specified joint. The methods then during a runtime phase receive a digitized target radiograph of a subject. The methods next during said runtime phase compare said digitized target radiograph to said computer model. The methods next during said runtime phase, in response to the comparison, automatically determine and report numerical measures of the differences of said digitized target radiograph relative to non-pathological shape and appearance represented by said computer model.

Methods for producing an image indicative of arthritic symptomatology are provided. The methods during a model building phase create a constrained deformable statistical template that is characterized by a set of parameters that spans a vector space representing a set of spatial positions of specified features of a specified joint. Each vector in the vector space describes a unique variation from a population mean. Creating the statistical template comprises building a statistical template from a set of sample radiographs of a skeletal system that includes at least the specified joint. The set of sample radiographs is chosen to substantially exclude pathological variations of a specified joint to represent variations in radiographic shape and appearance. The methods then during a runtime phase fit, in a digitized target two-dimensional radiograph of the specified joint, a plurality of loci associated with the specified features of the specified joint to allow parameterization in terms of the statistical template, wherein the digitized target radiograph may have traces of erosions. The methods next during the runtime phase parameterize positions of the plurality of loci fitted in the digitized target radiograph to generate an instance of the statistical template by deriving values for parameters of the digitized target radiograph from the statistical template. The methods next during the runtime phase search the digitized target radiograph by applying the statistical template to the digitized target radiograph until an optimal fit of the statistical template to at least one region of the digitized target radiograph is found, wherein searching the digitized target radiograph for the optimal fit comprises adjusting the position, orientation, shape and texture of the statistical template until the differences between the statistical template and the at least one region of the digitized target radiograph are minimized. The methods next during the runtime phase produce a comparison image by comparing the at least one region of the digitized target radiograph with the optimal fit of the statistical template.

Methods for deriving measures indicative of arthritic symptomatology are provided. The methods during a model building phase create a constrained deformable statistical template that is characterized by a set of parameters that spans a vector space representing a set of spatial positions of specified features of a specified joint. Each vector in the vector space describes a unique variation from a population mean. Creating the statistical template comprises building a statistical template from a set of sample radiographs of a skeletal system that includes at least the specified joint. The set of sample radiographs is chosen substantially exclude pathological variations of a specified joint to represent variations in radiographic shape and appearance. The methods then during a runtime phase fit, in a digitized target two-dimensional radiograph of the specified joint, a plurality of loci associated with the specified features of the specified joint to allow parameterization in terms of the statistical template, wherein the digitized target radiograph may have traces of erosions. The methods next during the runtime phase parameterize positions of the plurality of loci fitted in the digitized target radiograph to generate an instance of the statistical template by deriving values for parameters of the digitized target radiograph from the statistical template. The methods next during the runtime phase search the digitized target radiograph by applying the statistical template to the digitized target radiograph until an optimal fit of the statistical template to at least one region of the digitized target radiograph is found, wherein searching the digitized target radiograph for the optimal fit comprises adjusting the position, orientation, shape and texture of the statistical template until the differences between the statistical template and the at least one region of the digitized target radiograph are minimized. The methods next during the runtime phase derive at least one measure indicative of arthritic symptomatology of said specified joint by comparing the at least one region of the digitized target radiograph with the optimal fit of the statistical template.

Methods are provided. The methods during a model building phase create a constrained deformable statistical template that is characterized by a set of parameters that spans a vector space representing a set of spatial positions of specified features of a specified joint. Each vector in the vector space describes a unique variation from a population mean. Creating the statistical template comprises building a statistical template from a set of sample radiographs of a skeletal system that includes at least the specified joint. The set of sample radiographs is chosen to substantially exclude pathological variations of a specified joint to represent variations in radiographic shape and appearance. The methods then during a runtime phase fit, in a first digitized target two-dimensional radiograph of the specified joint, a plurality of loci associated with the specified features of the specified joint to allow parameterization in terms of the statistical template, wherein the first digitized target radiograph may have traces of erosions. The methods next during the runtime phase parameterize positions of the plurality of loci fitted in the first digitized target radiograph to generate an instance of the statistical template by deriving values for parameters of the first digitized target radiograph from the statistical template. The methods next during the runtime phase search the first digitized target radiograph by applying the statistical template to the first digitized target radiograph until a first optimal fit of the statistical template to at least one region of the first digitized target radiograph is found, wherein searching the first digitized target radiograph for the first optimal fit comprises adjusting the position, orientation, shape and texture of the statistical template until the differences between the statistical template and the at least one region of the first digitized target radiograph are minimized. The methods next during the runtime phase repeat steps of fitting, parameterizing, and searching for a second digitized target two-dimensional radiograph of said specified joint obtained at a second time to find a second optimal fit of said statistical template to at least one region of said second digitized target radiograph. The methods next during the runtime phase derive at least one measure indicative of the progression of arthritic symptomatology of said specified joint by comparing said first optimal fit of said statistical template and said second optimal fit of said statistical template.

Computer program products for producing an image indicative of arthritic symptomatology are provided, comprising a constrained deformable statistical template and computer program codes for receiving a digitized input target radiograph and generating an optimal fit of the statistical template to the digitized target radiograph. The statistical template is characterized by a set of parameters that spans a vector space representing a set of spatial positions of specified features of a specified joint. Each vector in the vector space describes a unique variation from a population mean, wherein the statistical template is built from a set of sample radiographs of a skeletal system that includes at least the specified joint. The set of sample radiographs is chosen substantially exclude pathological variations of a specified joint to represent variations in radiographic shape and appearance. The computer program products includes: code for fitting, in a digitized target two-dimensional radiograph of the specified joint, a plurality of loci associated with the specified features of the specified joint to allow parameterization in terms of the statistical template, wherein the digitized target radiograph may have traces of erosions; code for parameterizing positions of the plurality of loci fitted in the digitized target radiograph to generate an instance of the statistical template by deriving values for parameters of the digitized target radiograph from the statistical template; code for searching the digitized target radiograph by applying the statistical template to the digitized target radiograph until an optimal fit of the statistical template to at least one region of the digitized target radiograph is found, wherein searching the digitized target radiograph for the optimal fit comprises adjusting the position, orientation, shape and texture of the statistical template until the differences between the statistical template and the at least one region of the digitized target radiograph are minimized; and code for producing a comparison image by comparing the at least one region of the digitized target radiograph with the optimal fit of the statistical template.

Computer program products for producing an image indicative of arthritic symptomatology are provided, comprising a constrained deformable statistical template and computer program codes for receiving a digitized input target radiograph and generating an optimal fit of the statistical template to the digitized target radiograph. The statistical template is characterized by a set of parameters that spans a vector space representing a set of spatial positions of specified features of a specified joint. Each vector in the vector space describes a unique variation from a population mean, wherein the statistical template is built from a set of sample radiographs of a skeletal system that includes at least the specified joint. The set of sample radiographs is chosen to substantially exclude pathological variations of a specified joint to represent variations in radiographic shape and appearance. The computer program products includes: code for fitting, in a digitized target two-dimensional radiograph of the specified joint, a plurality of loci associated with the specified features of the specified joint to allow parameterization in terms of the statistical template, wherein the digitized target radiograph may have traces of erosions; code for parameterizing positions of the plurality of loci fitted in the digitized target radiograph to generate an instance of the statistical template by deriving values for parameters of the digitized target radiograph from the statistical template; code for searching the digitized target radiograph by applying the statistical template to the digitized target radiograph until an optimal fit of the statistical template to at least one region of the digitized target radiograph is found, wherein searching the digitized target radiograph for the optimal fit comprises adjusting the position, orientation, shape and texture of the statistical template until the differences between the statistical template and the at least one region of the digitized target radiograph are minimized; and code for deriving at least one measure indicative of arthritic symptomatology by comparing the at least one region of the digitized target radiograph with the optimal fit of the statistical template.

DETAILED DESCRIPTION

Figure 1:
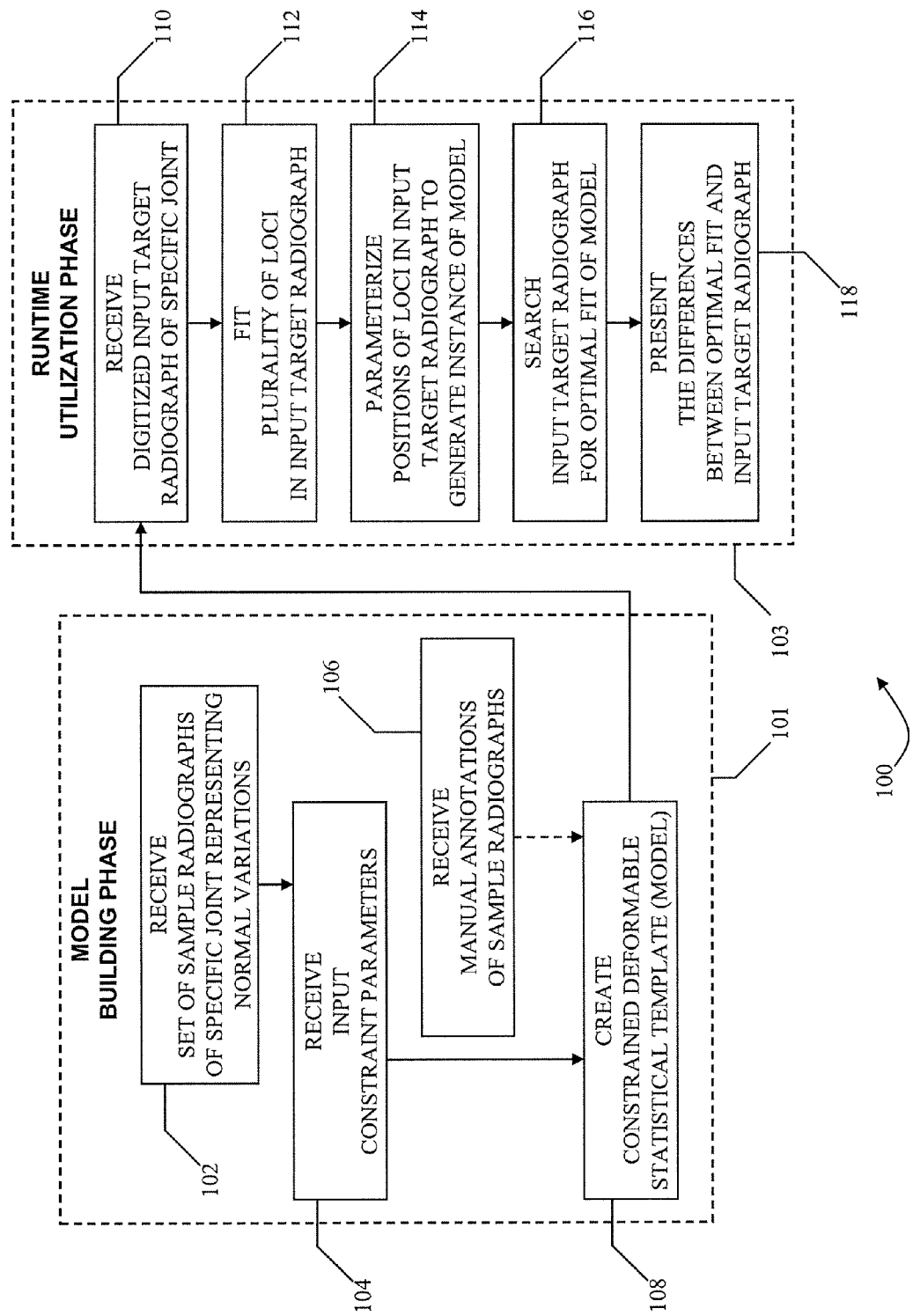
FIG. 1 illustrates a flow chart of a method for producing an image and deriving a measure indicative of arthritic symptomatology in accordance with some embodiments of the disclosed subject matter.

Characteristics of Desired Methods for Detection and Tracking of Rheumatoid Arthritis A method desired for monitoring the progression of rheumatoid arthritis has several characteristics. First, a desired method must have a high sensitivity and specificity for detecting the disease in its early phases, when DMARDs have their greatest potential benefits.

If a subject shows a progression of rheumatoid arthritis between baseline and follow-up image acquisitions then that subject is classified as a "positive." Conversely, a subject is classified as a "negative" when the disease did not get worse, or make further progresses. A correct classification of a subject is described as "true" and an incorrect classification is described as "false." Sensitivity to changes can be defined as the number of true positives divided by the number of true positives plus the number of false negatives. Specificity may also be defined as the number of true negatives divided by the number of true negatives plus false positives.

The sensitivity to changes may also be calculated as the Smallest Detectable Difference (SDD), determined by at least two observers, as the threshold for relevant progression. The SDD calculation may employ a statistical method for defining measurement errors and is based on the 95% limits of agreement as described by Bland and Altman in the *British Medical Journal*, 1996; 313:744, which is hereby incorporated by reference herein in its entirety. The method assesses whether an individual difference between two scores in a patient is a real change or whether it is a change that cannot be separated reliably from the measurement errors. Progression scores that are smaller than the SDD cannot be distinguished reliably from the measurement errors.

To determine the percentage of subjects who show a relevant change or progression over time, continuous data have to be dichotomized, and thus a valid and clinically relevant cut off level should be chosen. This cut off level is called the Minimal Clinically Important Difference (MCID). The SDD has been suggested as the cut off level, although the cut off level can be arbitrarily set at larger or smaller values.

The performance of the methods and computer program products can be measured by the ability of the methods and computer program products to define single point damage caused by the disease, quantify severity of such damage, monitor the progression of the disease and resulting damage with accuracy and precision, and reproduce such reliable results.

In the comparative assessment of scoring systems for rheumatoid arthritis, it is reliability that is usually determinative. The value of any scoring method used to measure a clinical variable depends on its reliability as shown by intra- and inter-reader reproducibility. This can be assessed at a given point in time using absolute scores, or between two time points using values related to progression. Spearman and Pearson correlation coefficients, intra-class correlation coefficients (ICC), and Kappa statistics are used to assess reliability. However, the most appropriate methods are ICC and Kappa statistics because Spearman and Pearson correlation coefficients measure only association and not agreement.

Reliability in some instances refers to the degree of agreement between raters as expressed by the intra-class correlation coefficient. In the case of an automated method, the reliability of repeated measurement or score may be compared to intra-rater or inter-rater reliability when either a single rater or multiple raters use the automated scoring techniques.

Other features of a desired method include widespread availability, cost effectiveness, lack of harmful side effects, ease of use, and rapid generation of results. Creation of a permanent record that can be easily randomized and blinded is also desirable. Yet another important characteristic of a desired method for tracking the progression of rheumatoid arthritis is its correlation with clinical disease course, which can often fluctuate.

Because of the importance of radiographic monitoring for determining long term outcomes, a standardized, systematic method to evaluate and quantify the amount and progression of radiographic damage caused by rheumatoid arthritis is desired. A quantitative approach to characterizing joint damage and damage progression offers several advantages over a method or system that relies on a qualitative evaluation using evaluation scores, such as "better," "the same," or "worse." Data have shown that quantitative, systematic approaches to evaluating the status of rheumatoid arthritis induced joint damage can result in a high inter- and intra-observer correlations and earlier characterization of the progression of the disease. Such methods also allow population means to be created and the population created as such, in turn, enables more accurate comparisons between different groups, and possibly even across different studies.

Introduction

In accordance with preferred embodiments of the present invention, methods and computer program products are provided for research and other investigative purposes or for diagnosing, and tracking the development of, arthritic symptoms. More particularly, in some embodiments, methods and computer program products are provided for detecting and monitoring the progression of rheumatoid arthritis (RA) in a skeletal joint.

In some embodiments, computer analysis of a digitized radiograph of a skeletal system that includes one or more joints, such as hands, knees, wrists, and feet, is carried out either automatically or semi-automatically using a deformable statistical template that has been produced by the statistical analysis of both the shape and texture of a number of hand- or machine-annotated sample radiographs of the normal anatomy (i.e., anatomy substantially free of rheumatoid arthritis) of a skeletal joint. The term texture of radiograph refers to local spatial variations in pixel brightness, such as grayscale level.

Automatic annotation of a digitized radiograph of a skeletal joint provides a set of two-dimensional points, also referred to as landmarks, that may be stored in a digital image and used to compare and monitor the changing contour and/or texture of a skeletal joint. The term annotation in some instances refers to the identification of certain landmark features, or salient boundaries or contours, in an image by overlying points and lines on the image to indicate the positions of the features or boundaries or contours.

The methods and computer program products described and claimed herein may be used to monitor and compare the progress of rheumatoid arthritis in a joint, changes in erosion size and location, and changes in integral erosion area. For instance, the methods and computer program products may carry out a baseline and follow-up comparison in which the development of a patient's arthritic symptoms may be monitored by comparing amongst the baseline image and subsequent follow-up images in a longitudinal study involving the patient.

The term erosion in some instances refers to a comparatively small volume of bone which has been lost through inflammation of the joint between two bones. For instance, erosion often appears as a dark patch on the perimeter of the joint on an x-ray image. This dark patch in the image is a region or aggregate of connected low grayscale-level pixels. Erosion may appear as a spatially distinct aggregate of low grayscale-level pixels. Erosion may be identified as a region of significant residual differences in pixel grayscale-levels when comparing with a synthetic image representing an instance of a deformable statistic template.

In order to characterize erosion, an aggregate of pixels is identified. This may be done by using standard region-growing or cluster analysis algorithms. These aggregates may then be counted individually as single erosions. The size of the erosions may be measured by calculating the longest distance across the aggregate of pixels, referred to as one-dimensional measurement, or the longest distance and the perpendicular distance to that distance, referred to as two-dimensional (2D) measurement. The size of the erosions may also be measured by calculating the area of the aggregate by summing the pixels that constitute it.

The aforementioned measurements may be used either individually or in combination to calculate the probability of this aggregate being true erosion rather than, for example, a region of low bone mass or an imaging artifact. In addition, it is possible to count the individual erosions to produce a metric for erosion score or erosion number on each joint, or in the entire hand.

Statistical measures may be used to identify an aggregate of pixels. The first order statistics are used to describe the image values for the single pixels. In dealing with a region of interest in an image, the mean value, the variance, the coefficient of variance, the skewness, the kurtosis, the energy and the entropy of the grayscale-level distribution of that region are typical first order statistics. First order statistical measurements suffer from the limitation that they carry no information regarding the relative positions of pixels with respect to each other. A set of descriptors based on the Gray Level Co-occurrence Matrix of a region of pixels constitute second-order statistics of texture.

Use of a deformable statistical template is described in detail in co-pending U.S. patent application Ser. No. 11/376,868, filed Mar. 16, 2006, which is hereby incorporated by reference herein in its entirety. The term deformable refers to a parameterization of the template in terms of a basis set of coordinates derived on the basis of sample training data. The term statistical refers to the basis of a model on an analysis of variation of parameters among members of a population of subjects.

Information gained from the analysis of a radiographic image using a statistical deformable template lends themselves to various other uses in accordance with alternate embodiments of the present invention. These other uses are based primarily on the fact that the template, in describing the shape and grayscale texture of an object in an image, must parameterize that object in terms of a statistical description of its shape and grayscale texture with reference to a mean and a modeled population of that class of objects.

Radiographs of a skeletal joint, such as the metacarpal-phalangeal (MCP) joint, or other joints of the bones of the hands, wrists, knee and feet, of a person, or animal, can be analyzed or used to train a deformable statistical template. Typically, two-dimensional (2D) radiographic images representing the transmission of penetrating radiation, such as x-ray, through the joint are employed.

While it is to be understood that the invention is not limited in scope to a particular modality of imaging systems or methods nor to a particular modality for storage and manipulation of an obtained image, or images, there are advantages that arise from particular modalities, such as the high spatial resolution advantageously provided by high energy radiation, such as x-rays or gamma rays.

Description of Methods and Computer Program Products

FIG. 1 is a flow chart of a method 100 for analyzing an image and deriving a measure indicative of arthritic symptomatology in accordance with some embodiments of the disclosed subject matter. FIGS. 2-6 would also be referenced, both individually as well as a group, to better illustrate method 100.

Method 100 is divided into two distinct phases. They are Model Building Phase 101 and Runtime Utilization Phase 103. During Model Building Phase 101, a constrained deformable statistical template, also simply referred to as a model, is built and trained using sample images of a joint of individual subjects.

At 102, a set of sample radiographs of a specific joint that represents normal, non-pathological variations is received. In some embodiments, this can be achieved by using only those radiographs of a specified joint of individual subjects who are free of rheumatoid arthritis, or other similarly afflicting disease. Using such constrained sample radiographs is important for building a constrained model that can exhibit immunity to misidentification of intensity variations present in the radiograph.

The accuracy to which a deformable statistical template can locate a boundary and represent pixel grayscale-levels is constrained by a particular statistical model. The template can only deform in the ways that have been observed in a set of samples provided to the template for training. If the object in a radiograph exhibits a particular type of deformation not present in the training set, the template will not fit to the object. This is true of fine deformations as well as coarse ones. For example, the template will usually fit to only a skeletal joint exhibiting normal, non-pathological variations, if only radiographs of normal joints that are free of arthritic symptoms are used to build and train the template.

In some embodiments, a set of sample, or training, two-dimensional (2D) data blocks are taken from an ensemble of radiographic images of a particular joint. In some embodiments, these data may be augmented by manual adjustments prior to the process of model building.

At 104, a set of input constraint parameters is received. When image representing individual instances of a statistical template is synthesized during a runtime phase, such as Runtime Utilization Phase 103, the model is constrained in its allowed deformations of appearance by choosing only the most important parameters, wherein the learned deformation has been captured so as to represent typically 95% of the appearance represented by the training set, and then to allow these parameters to be limited to typically +/−3 standard deviations each side of the mean appearance. Thus, it is ensured that the appearances generated by the template are similar to those in the original training set.

For example, the constraint parameters stop the deformable statistical template from producing individual instances that are very far from the mean in their shape and appearance. If the model is over-constrained, it may not adapt enough to normal variations and produce "false positive," or indication of disease that is not present. If, one the other hand, the model is under-constrained, it may be too flexible and adapt to an erosion, producing a "false negative," or indication of lack of disease where disease exists.

Optionally, at 106, manual annotations of the input sample radiographs are received for building a deformable statistical template semi-automatically. In some embodiments, a deformable statistical template is built semi-automatically using hand-annotated sample radiographs. For example, a technician can hand-draw the outlines of a bone or a joint in the sample radiographs. Manual annotations of the sample radiographs are not necessary when the template is built automatically.

At 108, a constrained deformable statistical template, or a model, is created from the constrained sample images. It is to be understood that creating a model encompasses both building and training the model. Analysis of a digitized input target radiograph of a joint proceeds on the basis of a model which is applied to the digitized target radiograph. The term model generally refers to any mathematical description that provides for parameterization of the shape, appearance, position and/or motion of a subject or its component parts. When a model is said to be statistical, it is to be understood that the model is based on an analysis of variation of parameters among members of a population of individual subjects.

Figure 2:
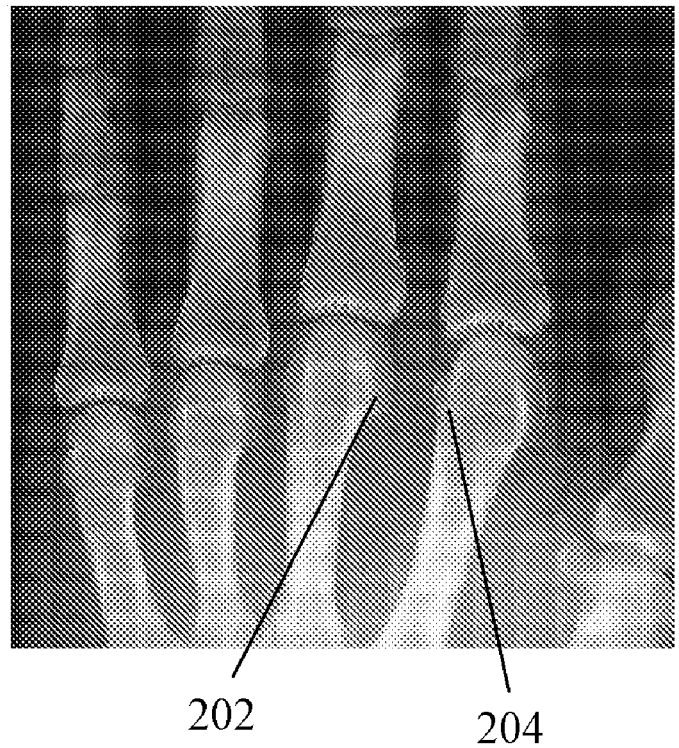
FIG. 2 shows landmarks and automated annotation of metacarpal-phalangeal (MCP) joints on a standard hand radiograph in accordance with some embodiments of the disclosed subject matter.
Figure 3:
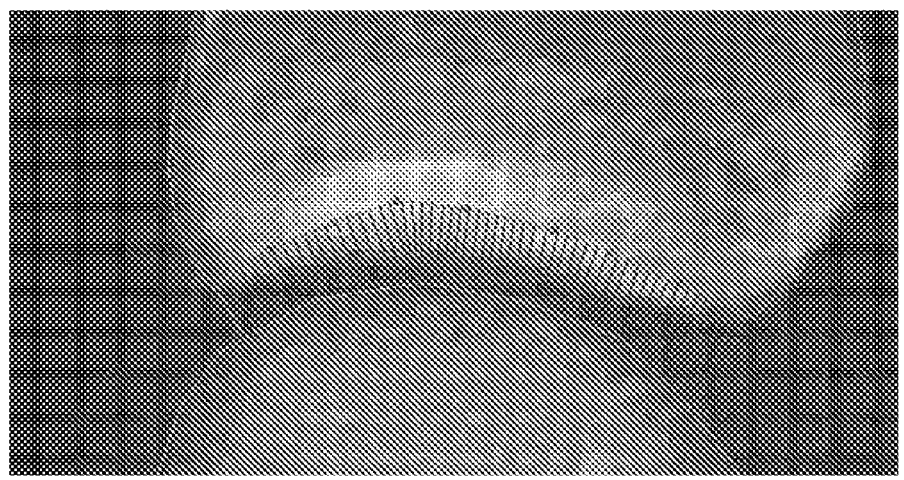
FIG. 3 shows the measurement of Joint Space Width (JSW) along a line from one edge of a joint to another in accordance with some embodiments of the disclosed subject matter.

More particularly, the present invention will be described with reference to a class of models, wherein each model represents the average relative positions of a specified set of two-dimensional (2D) points 202, 204, also referred to as "landmarks," outlining a joint, as described in FIG. 2, along with a mathematical description of the way these relative positions may vary in normal circumstances among individuals, as well as in a particular individual with the passage of time or due to an intervening circumstance, such the progression of rheumatoid arthritis.

Practice of the present invention is posited upon the existence of a mathematical model of plausible morphologies, wherein morphology encompasses shapes and shape variations, and may also encompass other aspects of appearance such as the texture of a modeled object. A method, such as method 100, is employed for applying the model to input data obtained from a digitized target radiograph of a specified joint. The method is not, however, specific to any particular placement of a set of points that are placed automatically, or semi-automatically, on features of the MCP or other joint of the bones of the hands, wrists, knees and feet.

For the purpose of building a model, the relative positions of two-dimensional (2D) points are consequential, rather than absolute, space-referenced positions. Thus, in building the model, the first step is typically to align each frame of 2D data to a common frame of reference, as may be achieved by using one of various standard alignment techniques, such as "Procrustes Analysis," which is described by Cootes et al., *Training Models of Shape from Sets of Examples*, in Proc. BMVC Springer-Verlag, pp. 9-18, 1992, which is hereby incorporated by reference herein in its entirety.

In some embodiments, a training set of radiographical images, or radiographs, with marked up features are used to build a statistical model. In some embodiments, a set of radiographs of a joint is used wherein the outlines of the joint are delineated using a set of two-dimensional (2D) coordinates, also referred to as a shape. The shapes are all aligned to a common frame of reference, generally defined by the base shape of the training set. The base shape is obtained by (1) removing the mean of each sample shape, (2) aligning the corresponding shapes to each other, and then (3) normalizing the length of the shape vectors to unit length. Computation of the base shape can be achieved, for example, using the "Procrustes Algorithm" by Cootes et al.

A shape can be described as a column vector x in Equation (1):

$$x=\{x_1, x_2, \ldots, x_n, y_1, y_2, \ldots, y_n\}^t,$$

where $(x_i, y_i)$ are the 2D coordinates of the point with index "i" and the superscript "t" that denotes the transpose operation. In some embodiments, the shapes are aligned to the reference frame of the model using a method described by T. F. Cootes and C. J. Taylor, *Statistical Models of Appearance for Medical Image Analysis and Computer Vision*, in Proc. SPIE Medical Imaging, (2001), which is hereby incorporated by reference herein in its entirety. The shapes are described by the Cootes method as a vectors x' in Equation (2):

$$x'=T(x),$$

where x' is the result of applying the matrix of computed alignment transformation parameters, T, to x.

After the alignment of the sample shapes the training set can be represented by a matrix X', where the aligned sample shapes are stored in the columns of X'. The base shape is now by definition the mean of the columns of X'.

For modeling the texture of the radiographs, sampling points are defined with respect to the reference frame of the base shape. The grayscale-values at the location of these sampling points can be collected in a column vector g in Equation (3):

$$g=\{g_1, g_2, \ldots, g_m\}^t,$$

where $g_i$ is the grayscale-value of the sampling location with index "i". Since the aim is to predict displacements from texture and position information, perturbations are applied to the example shapes to get texture information for off-target positions.

These perturbations consist of two components. The first component takes care of global properties, such as scaling, rotation and translation, whereas the second takes care of local displacements. These displacements can be obtained in different ways. For example, two example shapes are chosen randomly and a fraction of their difference is chosen as perturbation. Another option is to randomly displace all the points of an example shape. Since the amount of data obtained in this way is often in higher dimension, it can be advantageous to perform dimension reduction operation. An example is Principal Component Analysis (PCA), as described by Johnson and Wichern, in *Applied Multivariate Statistical Analysis*, pp. 458-513 (5th Edition, 2002), which is hereby incorporated by reference herein in its entirety.

It is also advantageous to make the texture samples as invariant as possible with respect to intensity variations across the example images. Local and global normalization schemes, such as the Procrustes Analysis, infra, can be used for this purpose, and it is assumed that such an appropriate normalization procedure has been applied before dimension reduction. After dimension reduction, a transformation R maps a vector g to a vector b of lower dimension. In the case of PCA, this transformation can be written as Equation (4):

$$b = Rg,$$

where R is the transformation matrix.

A direct advantage of PCA is that an estimated reconstruction of the texture vector g can be synthesized as in Equation (5):

$$g_r = \bar{g} + R^t b,$$

where $g_r$ is the reconstructed vector and g is the mean of the samples used to compute the PCA. However, other methods for synthesizing texture vectors based on the training data are also available.

After obtaining the dimension reduction transformation, the model is ready to be trained. The training consists of the creation of a set of source and target vectors. The target vectors represent the displacements δx' needed to get from the current shape position to the correct shape position in the frame of reference of the base shape. The corresponding source vectors consist of two contributions. The first is the texture information encoded by the vector b, the second is the difference δs between the current shape in the reference frame of the base shape and the base shape itself.

To obtain the training data, the sample data is again perturbed in a similar way as described above. The target and source vectors are stored for each perturbation. Their relationship can be trained using methods, such as statistical classifiers or via linear regression, that are known in the art. In the current implementation linear regression is used. Thus the predicted displacements would be given by Equation (6):

$$\delta x' = A[b|\delta s]$$

where δx' is the vector of updates to the current point positions in the reference frame of the base shape, A is the regression matrix, and b is as defined above and δs is the vector of differences between the current shape in the reference frame of the base shape and the base shape itself.

During Runtime Utilization Phase 103, the model created during Model Building Phase 101 at 102, 104, 106, and 108 is applied to a digitized target radiograph to detect any pathological variations that may be present in the digitized target radiograph of a joint, while ignoring normal variations.

A digitized target radiograph, which is unseen by the model, is annotated using the trained relationship described in the Equation (6). First an instance of the shape is placed in the image. The instance is transformed into the reference frame of the base shape, its difference with the base shape is recorded, and its grayscale values are sampled. After applying the dimension reduction R used in Equation (4) on the grayscale values the linear regression is applied to obtain the sought displacements. In general a few iterations of this procedure are needed to find a desirable solution.

This process is repeated until there is convergence within a specified criterion or else until a specified maximum number of iterations have been executed. When the iterations are completed, the output of the final step is a solution for the full set of 2D points as fit by the model parameters; this is an optimal fit.

A final annotation (i.e., identification, in the radiograph, of the specified initialization points) may now be used to extract a number of measurements from the radiograph, of which examples are outlined below. As stated above, the method allows for reconstruction of texture vectors which can be used to generate synthetic images. The reconstruction can be based on PCA or any other appropriate method that is able to reconstruct texture vectors from the final annotation. It may even be possible to use the b and/or δs and/or δx' parameters from the final annotation directly for comparison.

More particularly, at 110, a digitized target radiograph of a specific joint is received. Next, at 112, a plurality of loci is fitted in the digitized target radiograph to prepare for parameterization of the joint in the target radiograph. The specified points are preliminarily identified, or annotated, in an image of an MCP or other joint. In some embodiments, annotation is performed by a program element trained to identify these positions. In semi-automatic analysis, the user of the application is asked to define some subset, also referred to as proper or full, of landmarks on the MCP or other joint radiographs that were identified, either automatically or semi-automatically, in creation of the deformable statistical template. These positions are defined in such a manner as to effectively describe the radiographic appearance of the joint either by relation to external, or other, features.

At 114, the positions of the plurality of loci in the digitized target radiograph are parameterized, thereby generating an instance of the statistical template. Even though the precise morphology of the joint varies among subjects and changes with time, these landmarks remain identifiable, for the most part. The template, or model, is statistical in that it models the distribution with the mean and normal variation, or other moments serving, without limitation, as representative characterizations of the radiographic appearance of the particular joint across an ensemble of subjects. The template, thus, allows for parameterization of the morphology in terms of a finite number of values, with the present invention independent of any particular scheme of parameterization.

Figure 5:
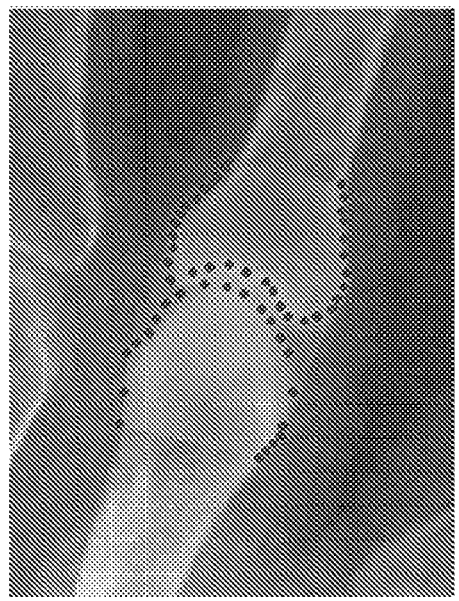
FIG. 5 shows a template of an MCP joint of normal shape and appearance, optimally fitted in accordance with some embodiments of the disclosed subject matter.

At 116, the digitized target radiograph is searched using the constrained deformable statistical model until an optimal fit is found, as illustrated in FIG. 5. A search algorithm aims to match a deformable statistical template to a new image. The algorithm uses the sampled image grayscale-level appearance, also referred to as texture, and the differences between average shape and current shape to predict displacements to the current positions of annotation points. This locates a better position for each landmark feature in the radiograph. The search algorithm iterates until the differences between the current estimate of landmark feature positions and calculated update positions have no statistically significant difference. At this point, the deformable statistical template is said to have reached an "optimal fit" to the image.

The statistical model deployed predicts the movement of the individual points of a set of two-dimensional (2D) points to the correct location characterizing the skeletal morphology of the joint in the image. The prediction is based on texture and position parameters of the actual instance of the model and produces displacements to update the current locations of the 2D points.

Since a deformable statistical template has been used to detect and annotate the joint, a parameterization of the joint shape may be determined from optimized fit of this template. Therefore, the shape, including texture information, of the joint may be compared to that of a universe of normal (i.e., disease free) joints, or else the changes in shape parameters at different time points in a longitudinal study may be used as a novel measurement of disease progression.

Changes may be mapped in specified measures over the course of a period of time, whether in the presence of a medical intervention, or otherwise. The case of a medical intervention, in the most general sense, will be referred to herein, and in any appended claims, as a "therapeutic modality," and will include the administration of medicinal agents, but will not be limited thereto.

In semi-automatic analysis, the user of the application is asked to indicate the joints on the hand radiograph. A deformable template is used to search the image for an optimized fitting of the template in order to best describe the underlying appearance of the joint, on the basis of specified points. In both automatic and semi-automatic analysis, the margins of the joints are automatically annotated.

At 118, the digitized target radiograph is compared with the optimally fitted statistical template and the differences between the digitized target radiograph and the optimally fitted statistical template are presented. In some embodiments, a comparison image is produced using the difference between the target image and the optimally fitted statistical template. A comparison image in some instances refers to an image in which each pixel represents a measure comparing the intensity value of the corresponding pixels of a region of the target, or input, image and the synthetic, or parameterized, image. Classification of erosion and non-erosion on a per-pixel basis for the joint allows visualization of an erosion likelihood map, and the enumeration of erosion pixels gives overall erosion score for the joint.

Features extracted from a local neighborhood of a given pixel that encapsulate local texture and/or shape may be used as input to the classification process of erosion and non-erosion per-pixel. A method for performing such a feature extraction and classification step is described by Zhang et al. in *Local features and kernels for classification of texture and object categories: A comprehensive study*, in the International Journal of Computer Vision, September 2006, which is hereby incorporated by reference herein in its entirety.

Bayesian prior probabilities for whether each pixel is normal or in an erosion area may be used as input to the classification step. A method for performing such prior probability estimates in a medical application is described by S. J. Caulkin, *Generating Synthetic Abnormalities in Digital Mammograms Using Statistical Models*, in Ph.D. Thesis, University of Manchester, 2001, which is hereby incorporated by reference herein in its entirety.

A classifier of erosion score for a whole joint, which learns the relationship between various joint shape and texture features and an overall score for the joint, may be also used. Output from per-pixel based approach may be employed as part of the input to the higher level full-joint classifier for erosion score, either as a simple sum of per-pixel likelihoods, or by applying clustering, grouping, and/or filtering techniques to the erosion likelihood map. The classification results may also be combined to provide a combined probability score, as taught in UK Patent Application No. GB 20039821A, filed Apr. 30, 2003 and published Dec. 8, 2004, which is hereby incorporated by reference herein in its entirety.

In some embodiments, one or more measures indicative of damages caused by rheumatoid arthritis is presented using the difference between the target image and the optimally fitted statistical template. The automated annotation that has been described is used, in accordance with preferred embodiments of the invention, to extract a number of measurements form the radiograph.

For examples, the narrowing of Joint Space Width (JSW) in any annotated joint can be measured by the comparison of differences in minimum Joint Space Width (mJSW) at various time points in a longitudinal study or by comparison to the JSW of other joints. For the JSW at any position in the joint, the position of the JSW measurement may be parameterized along a line from one edge of the joint to the other, and thus this measurement may be compared at various time points in a longitudinal study, as shown in FIG. 2. The area defined by annotation of the joint can be also measured as well as the angle of subluxation may be measured by comparison of the alignment of the metacarpal and phalangeal bones of the hand.

Figure 4:
FIG. 4 illustrates small erosion on the metacarpal head of a MCP joint, detected as a difference in texture of a radiographical image in accordance with some embodiments of the disclosed subject matter.
Figure 6:
FIG. 6 depicts regions of interest overlaid on the original image of FIG. 4, highlighting an erosion abnormality in accordance with some embodiments of the disclosed subject matter.

Because the statistical template has been deliberately built using radiograph examples representing the normal hand anatomy, the statistical template of shape and grayscale texture is unable to fully describe the destruction of joints (erosions) present in a hand of a patient suffering from RA. This lack of accurate description is manifested by a difference in the texture of the radiographic image compared to the reconstruction produced by the statistical template, as shown in FIGS. 4-6. The differences can be analyzed as spatially distinct clusters of pixels with significant residual differences in grayscales when comparing the model reconstruction with the image. These clusters may then be counted or integrated to produce a measure for erosion score or erosion number on each joint (or in the entire hand).

Computer Program Products Implementation

The disclosed methods for diagnosing rheumatoid arthritis may be implemented as a computer program product for use with a computer system. Such implementations may include a series of computer instructions fixed either on a tangible medium, such as a computer readable medium (e.g., a diskette, CD-ROM, ROM, flash memory or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Various Embodiments of the Invention are Provided as Examples and not Limitations The described embodiments of the invention are intended to be merely exemplary and therefore numerous variations and modifications will be apparent to those skilled in the art. For example, as wrists, knees and feet are also scored in terms of joint space narrowing, erosions and general degradation of the joint, the same technology discussed above may be applied to radiographs of the wrists, knees and feet in addition to the hands in order to produce automated and semi-automated methods.

The same principles may be also applied to CT images or magnetic resonance images (MRI) of the hands, wrists, knees and feet. Assessment of rheumatoid arthritis in hands, for example, is most commonly done on slice images of the hands in the coronal plane. Also, erosions show up well in various MRI sequences and may be counted. A scoring system currently employed in this context is the Outcome Measures in Rheumatology Clinical Trials (OMERACT) Rheumatoid Arthritis MRI Scoring System (RAMRIS). All such variations and modifications are intended to be within the scope of the present invention.

What is claimed is:

1. A method for automatically determining numerical measures of the differences of a digitized target radiograph relative to non-pathological shape and appearance represented by a computer model, said method comprising:
   a. during a model building phase building a computer model from a set of sample radiographs chosen to substantially exclude pathological variations of a specified joint to represent variations in radiographic shape and appearance;
   b. during a runtime phase receiving a digitized target radiograph of a subject;
   c. during said runtime phase comparing said digitized target radiograph to said computer model; and
   d. during said runtime phase, in response to the comparison, automatically determining and report numerical measures of the differences of said digitized target radiograph relative to non-pathological shape and appearance represented by said computer model.

2. The method of claim 1, wherein said computer model comprises a constrained deformable statistical template that is characterized by a set of parameters that spans a vector space representing a set of spatial positions of said specified joint, each vector in said vector space describing a unique variation from a population mean, and wherein said constrained deformable statistical template receives input constraint parameters which define the extent to which said radiographical shape and appearance of said specified joint are allowed to deform.

3. The method of claim 1, wherein comparing said digitized target radiograph to said computer model comprises:
   e. during said runtime phase fitting a plurality of loci associated with said specified joint in said digitized target radiograph;
   f. during said runtime phase sampling, at each of the positions of said plurality of loci, said digitized target radiograph, wherein said digitized target radiograph sampled at each of the positions of said plurality of loci indicate said appearance of said specified joint at each of the positions of said plurality of loci;
   g. during said runtime phase generating an instance of said statistical template using said statistical template, wherein said statistical template outputs said instance of said statistical template using the positions of said plurality of loci and said digitized target radiographs sampled at each of the positions of said plurality of loci;
   h. during said runtime phase generating a successive instance of said statistical template using said statistical template, wherein said statistical template outputs said successive instance of said statistical template using the positions of a new plurality of loci of said instance of said statistical template placed on said digitized target radiograph and images sampled at each of the positions of said new plurality of loci;
   i. during said runtime phase comparing said instance of said statistical template and said successive instance of said statistical template; and
   j. during said runtime phase obtaining an optimally fitted instance of said statistical template by repeating steps (h) and (i) until there is no statistically significant difference between said instance of said statistical template and said successive instance of said statistical template.

4. The method of claim 1, wherein automatically determining said numerical measures of the differences of said digitized target radiograph relative to non-pathological shape and appearance represented by said computer model comprises during said runtime phase determining the severity of arthritis represented in said digitized target radiograph of said subject by comparing said digitized target radiograph with said optimally fitted instance of said statistical template.

5. The method of claim 1, wherein said differences of said digitized target radiograph relative to non-pathological shape and appearance represented by said computer model comprises the differences between the appearance of each pixel of said digitized target radiograph and the appearance of each pixel of said non-pathological appearance represented by said computer model.

6. A method for producing an image indicative of arthritic symptomatology, said method comprising:
   a. during a model building phase creating a constrained deformable statistical template characterized by a set of parameters that spans a vector space representing a set of spatial positions of specified features of a specified joint, each vector in said vector space describes a unique variation from a population mean, wherein creating said statistical template comprises building a statistical template from a set of sample radiographs of a skeletal system that includes at least said specified joint, said set of sample radiographs chosen to substantially exclude pathological variations of a specified joint to represent variations in radiographic shape and appearance;
   b. during a runtime phase fitting, in a digitized target two-dimensional radiograph of said specified joint, a plurality of loci associated with said specified features of said specified joint to allow parameterization in terms of said statistical template;
   c. during said runtime phase parameterizing positions of said plurality of loci fitted in said digitized target radiograph to generate an instance of said statistical template by deriving values for parameters of said digitized target radiograph from said statistical template;
   d. during said runtime phase searching said digitized target radiograph by applying said statistical template to said digitized target radiograph until an optimal fit of said statistical template to at least one region of said digitized target radiograph is found, wherein searching said digitized target radiograph for said optimal fit comprises adjusting the position, orientation, shape and texture of said statistical template until the differences between said statistical template and said at least one region of said digitized target radiograph are minimized; and
   e. during said runtime phase producing a comparison image by comparing said at least one region of said digitized target radiograph with said optimal fit of said statistical template.

7. The method of claim 6, further comprising displaying at least one of:
   a. said comparison image;
   b. the subtraction of said digitized target radiograph from said comparison image; and
   c. a colored superposition of said digitized target radiograph and said comparison image.

8. The method of claim 6, wherein said skeletal system comprises one or more of the joints between the bones of the hands, wrists, knees, legs, or feet.

9. The method of claim 6, wherein said specified joint comprises metacarpal-phalangeal joint.

10. The method of claim 6, wherein said digitized target two-dimensional radiograph comprises an x-ray image, computed tomography (CT) image, and a magnetic resonance imaging (MRI) image.

11. A non-transitory computer program product for producing an image indicative of arthritic symptomatology, said computer program product comprising:
   a. a constrained deformable statistical template characterized by a set of parameters that spans a vector space representing a set of spatial positions of specified features of a specified joint, each vector in said vector space describes a unique variation from a population mean, wherein said statistical template comprises is built from a set of sample radiographs of a skeletal system that includes at least said specified joint, said set of sample radiographs chosen to substantially exclude pathological variations of a specified joint to represent variations in radiographic shape and appearance;
   b. code for fitting, in a digitized target two-dimensional radiograph of said specified joint, a plurality of loci associated with said specified features of said specified joint to allow parameterization in terms of said statistical template;
   c. code for parameterizing positions of said plurality of loci fitted in said digitized target radiograph to generate an instance of said statistical template by deriving values for parameters of said digitized target radiograph from said statistical template;
   d. code for searching said digitized target radiograph by applying said statistical template to said digitized target radiograph until an optimal fit of said statistical template to at least one region of said digitized target radiograph is found, wherein searching said digitized target radiograph for said optimal fit comprises adjusting the position, orientation, shape and texture of said statistical template until the differences between said statistical template and said at least one region of said digitized target radiograph are minimized; and
   e. code for producing a comparison image by comparing said at least one region of said digitized target radiograph with said optimal fit of said statistical template.

12. A method for deriving measures indicative of arthritic symptomatology, said method comprising:
   a. during a model building phase creating a constrained deformable statistical template characterized by a set of parameters that spans a vector space representing a set of spatial positions of specified features of a specified joint, each vector in said vector space describes a unique variation from a population mean, wherein creating said statistical template comprises building a statistical template from a set of sample radiographs of a skeletal system that includes at least said specified joint, said set of sample radiographs chosen to substantially exclude pathological variations of a specified joint to represent variations in radiographic shape and appearance;
   b. during a runtime phase fitting, in a digitized target two-dimensional radiograph of said specified joint, a plurality of loci associated with said specified features of said specified joint to allow parameterization in terms of said statistical template;
   c. during said runtime phase parameterizing positions of said plurality of loci fitted in said digitized target radiograph to generate an instance of said statistical template by deriving values for parameters of said digitized target radiograph from said statistical template;
   d. during said runtime phase searching said digitized target radiograph by applying said statistical template to said digitized target radiograph until an optimal fit of said statistical template to at least one region of said digitized target radiograph is found, wherein searching said digitized target radiograph for said optimal fit comprises adjusting the position, orientation, shape and texture of said statistical template until the differences between said statistical template and said at least one region of said digitized target radiograph are minimized; and
   e. during said runtime phase deriving at least one measure indicative of arthritic symptomatology of said specified joint by comparing said at least one region of said digitized target radiograph with said optimal fit of said statistical template.

13. The method of claim 12, wherein said at least one measure indicative of arthritic symptomatology of said specified joint encompasses at least one of:
   a. a cluster of pixels indicting joint erosions;
   b. one-dimensional extent of a cluster of pixels indicating joint erosions;
   c. two-dimensional extent of a cluster of pixels indicating joint erosions;
   d. count of pixels in a cluster of pixels indicating joint erosions;
   e. texture of a cluster of pixels indicating joint erosions; and
   f. first and second order statistics related to the texture of a cluster of pixels indicating joint erosions.

14. The method of claim 12, wherein said at least one measure indicative of arthritic symptomatology of said specified joint are chosen from a group including:
   a. the minimum joint space width (JSW) in any annotated joint
   b. the narrowing of JSW measured in a joint when a baseline radiograph and follow-up radiographs are compared;
   c. the narrowing of JSW measured in a joint when the joint is compared to other joints of the same individual;
   d. the JSW at a specified position in a joint;
   e. the area defined by an annotation of a joint;
   f. the angle of subluxation measured by comparison of the alignment of the metacarpal and phalangeal bones of the hand;
   g. the presence or absence of an erosion or cyst in a joint; and
   h. the extent of each erosion or cyst present on a joint.

15. The method of claim 12, further comprising scoring said specified joint with respect to the progression of arthritic symptomatology based on said at least one measure.

16. The method of claim 12, wherein said digitized two-dimensional target radiograph comprises an x-ray image, a CT image, or an MRI image.

17. The method of claim 12, further comprising predicting a clinical outcome of a therapeutic modality based on characterization of a skeletal morphology in terms of parameters of said constrained deformable statistical template.

18. The method of claim 12, wherein the step of fitting at runtime said plurality of loci associated with said specified features of said specified joint comprises receiving an operator input.

19. The method of claim 12, further comprising repetition of steps (b) through (e) at successive points in time for describing evolution of a skeletal morphology over time.

20. The method of claim 12, further comprising performing a clinical intervention between successive iterations of the step (b) through (e).

21. A non-transitory computer program product for deriving measures indicative of arthritis symptomatology, said computer program product comprising:
   a. a constrained deformable statistical template characterized by a set of parameters that spans a vector space representing a set of spatial positions of specified features of a specified joint, each vector in said vector space describes a unique variation from a population mean, wherein said statistical template comprises is built from a set of sample radiographs of a skeletal system that includes at least said specified joint, said set of sample radiographs chosen to substantially exclude pathological variations of a specified joint to represent variations in radiographic shape and appearance;
   b. code for fitting, in a digitized target two-dimensional radiograph of said specified joint, a plurality of loci associated with said specified features of said specified joint to allow parameterization in terms of said statistical template;
   c. code for parameterizing positions of said plurality of loci fitted in said digitized target radiograph to generate an instance of said statistical template by deriving values for parameters of said digitized target radiograph from said statistical template;
   d. code for searching said digitized target radiograph by applying said statistical template to said digitized target radiograph until an optimal fit of said statistical template to at least one region of said digitized target radiograph is found, wherein searching said digitized target radiograph for said optimal fit comprises adjusting the position, orientation, shape and texture of said statistical template until the differences between said statistical template and said at least one region of said digitized target radiograph are minimized; and
   e. code for deriving at least one measure indicative of arthritic symptomatology of said specified joint by comparing said at least one region of said digitized target radiograph with said optimal fit of said statistical template.

22. A method comprising:
   a. during a model building phase creating a constrained deformable statistical template characterized by a set of parameters that spans a vector space representing a set of spatial positions of specified features of a specified joint, each vector in said vector space describes a unique variation from a population mean, wherein creating said statistical template comprises building a statistical template from a set of sample radiographs of a skeletal system that includes at least said specified joint, said set of sample radiographs chosen to substantially exclude pathological variations of a specified joint to represent variations in radiographic shape and appearance;
   b. during a runtime phase fitting, in a first digitized target two-dimensional radiograph of said specified joint, a plurality of loci associated with said specified features of said specified joint to allow parameterization in terms of said statistical template;
   c. during said runtime phase parameterizing positions of said plurality of loci fitted in said first digitized target radiograph to generate an instance of said statistical template by deriving values for parameters of said digitized target radiograph from said statistical template;
   d. during said runtime phase searching said first digitized target radiograph by applying said statistical template to said first digitized target radiograph until a first optimal fit of said statistical template to at least one region of said first digitized target radiograph is found, wherein searching said first digitized target radiograph for said first optimal fit comprises adjusting the position, orientation, shape and texture of said statistical template until the differences between said statistical template and said at least one region of said first digitized target radiograph are minimized;
   e. during said runtime phase repeating steps (b), (c) and (d) for a second digitized target two-dimensional radiograph of said specified joint obtained at a second time to find a second optimal fit of said statistical template to at least one region of said second digitized target radiograph; and
   f. during said runtime phase deriving at least one measure indicative of the progression of arthritic symptomatology of said specified joint by comparing said first optimal fit of said statistical template and said second optimal fit of said statistical template.

23. The method of claim 22, wherein said at least one measure indicative of the progression of arthritic symptomatology of said specified joint are chosen from a group including:
   a. the minimum joint space width (JSW) in any annotated joint
   b. the narrowing of JSW measured in a joint when a baseline radiograph and follow-up radiographs are compared;
   c. the narrowing of JSW measured in a joint when the joint is compared to other joints of the same individual;
   d. the JSW at a specified position in a joint;
   e. the area defined by an annotation of a joint;
   f. the angle of subluxation measured by comparison of the alignment of the metacarpal and phalangeal bones of the hand;
   g. the presence or absence of an erosion or cyst in a joint; and
   h. the extent of each erosion or cyst present on a joint.

* * * * *